US011971961B2

(12) United States Patent
Lee et al.

(10) Patent No.: US 11,971,961 B2
(45) Date of Patent: Apr. 30, 2024

(54) DEVICE AND METHOD FOR DATA FUSION BETWEEN HETEROGENEOUS SENSORS

(71) Applicant: DAEGU GYEONGBUK INSTITUTE OF SCIENCE AND TECHNOLOGY, Daegu (KR)

(72) Inventors: Jin Hee Lee, Daegu (KR); Kumar Ajay, Daegu (KR); Soon Kwon, Daegu (KR); Woong Jae Won, Seoul (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 498 days.

(21) Appl. No.: 17/274,870

(22) PCT Filed: Sep. 27, 2019

(86) PCT No.: PCT/KR2019/012562
§ 371 (c)(1),
(2) Date: Mar. 10, 2021

(87) PCT Pub. No.: WO2020/067751
PCT Pub. Date: Apr. 2, 2020

(65) Prior Publication Data
US 2022/0055652 A1   Feb. 24, 2022

(30) Foreign Application Priority Data

Sep. 28, 2018  (KR) .................. 10-2018-0116141
Feb. 21, 2019  (KR) .................. 10-2019-0020480

(51) Int. Cl.
*G06F 18/25* (2023.01)
(52) U.S. Cl.
CPC ....... *G06F 18/25* (2023.01); *B60W 2420/403* (2013.01); *B60W 2420/408* (2024.01); *B60W 2554/4048* (2020.02)

(58) Field of Classification Search
CPC .............. G06F 18/25; B60W 2420/42; B60W 2420/52; B60W 2554/4048; G01S 17/931;
(Continued)

(56) References Cited

U.S. PATENT DOCUMENTS 8,179,393 B2     5/2012  Minear et al.
2008/0112610 A1*  5/2008  Israelsen ............... G06T 17/00
                                             382/154
2018/0136332 A1*  5/2018  Barfield, Jr. ....... G06V 10/7784

FOREIGN PATENT DOCUMENTS

JP   2013-222423   10/2013
KR   10-1033167    5/2011
(Continued)

OTHER PUBLICATIONS

Ajay Kumar Gurumadaiah et al., "LIDAR and Camera Data Fusion for Object Depth Estimation in Autonomous Vehicle", 2018 Institute of Embedded Engineering of Korea Fall Conference, Nov. 17, 2018, pp. 235-240.
(Continued)

*Primary Examiner* — Tung S Lau
(74) *Attorney, Agent, or Firm* — LEX IP MEISTER, PLLC

(57) ABSTRACT

An apparatus and method for data fusion between heterogeneous sensors are disclosed. The method for data fusion between the heterogeneous sensors may include identifying image data and point cloud data for a search area by each of a camera sensor and a LiDAR sensor that are calibrated using a marker board having a hole; recognizing a translation vector determined through calibrating of the camera sensor and the LiDAR sensor; and projecting the point cloud data of the LiDAR sensor onto the image data of the camera
(Continued)

sensor using the recognized translation vector to fuse the identified image data and point cloud data.

10 Claims, 9 Drawing Sheets

(58) Field of Classification Search
CPC ........ G01S 7/4972; G01S 17/86; G01S 17/89; G06T 2207/10024; G06T 2207/20221; G06T 2207/30208; G06T 7/85; G06T 2207/10028; G06T 2207/30252; G01D 18/00; G05D 1/02
See application file for complete search history.

(56) References Cited

FOREIGN PATENT DOCUMENTS

| KR | 10-2011-0087893 | 8/2011 |
|---|---|---|
| KR | 10-2015-0069927 | 6/2015 |
| KR | 10-2016-0036723 | 4/2016 |
| KR | 10-2017-0127103 | 11/2017 |
| KR | 10-2018-0055292 | 5/2018 |
| KR | 10-2018-0092066 | 8/2018 |
| KR | 10-1918007 | 11/2018 |
| KR | 10-2143757 | 8/2020 |

OTHER PUBLICATIONS

KIPO, Office Action of Application No. 10-2020-0186619, Jun. 25, 2021.

\* cited by examiner (a)

(b)

(a) 20meters (b) 30meters (c) 40meters

DEVICE AND METHOD FOR DATA FUSION BETWEEN HETEROGENEOUS SENSORS

TECHNICAL FIELD

The present disclosure relates to an apparatus and method for data fusion between heterogeneous sensors, and more particularly, to a technique for performing calibration between heterogeneous sensors, for fusing, by using a translation vector, data identified by each of the calibrated heterogeneous sensors, that is, a camera sensor and a LiDAR sensor, and for elevating accuracy of fusion data obtained through fusing of data.

BACKGROUND ART

Recently, with the development of sensing technology, interest in data fusion and data integration technology using multi-sensors such as cameras, LiDARs, and radars has increased. In particular, in the field of robots or autonomous driving systems, stable mobility through complementation between sensors has emerged as an important issue. By integrating the advantages of each sensor through recently developed sensor fusion technology, it has become possible to overcome the shortcomings of individual sensors and to sufficiently address the issue of stable mobility.

As an example, a distance measurement sensor such as a LiDAR sensor may be used with an RGB camera to search for various objects. The LiDAR sensor may provide 3D position and depth information for the objects, while the RGB camera may provide 2D position and color information for the objects. As a result, it is possible to visualize the objects in a more realistic world by mapping the 3D location information to 2D image data.

However, in order to improve recognition technology using cameras and LiDARs for an autonomous vehicle, it is first required to accurately recognize the relative position (including pose and direction information) between the cameras and the LiDARs. This may be approached as an issue of determining translation between frames of two heterogeneous sensors, that is, an issue of extrinsic calibration. In order to identify unique features based on point cloud data of the LiDAR and image data of the camera, a correspondence relationship between the LiDAR and the camera should be established.

However, when fusing data identified by each of the LiDAR and the camera based on the established correspondence relationship between the LiDAR and the camera, the criterion for determining whether fusion data is properly fused is ambiguous in practice. Therefore, what is needed in the art is a technique for evaluating accuracy of the fusion data to provide safety and reliability thereof.

DISCLOSURE OF INVENTION

Technical Problem

The present disclosure is directed to providing an apparatus and method for improving accuracy of detecting distant objects regardless of mounting positions of heterogeneous sensors by performing calibration between the heterogeneous sensors through a 3D marker board having a hole.

In addition, the present disclosure is further directed to providing an apparatus and method for generating fusion data by fusing data identified by each of calibrated heterogeneous sensors, and for evaluating accuracy of the generated fusion data.

Solution to Problem

A method for calibration between heterogeneous sensors according to an embodiment of the present disclosure may include identifying image data of a marker board photographed by a camera sensor; identifying point cloud data of the marker board sensed by a LiDAR sensor; recognizing a hole in the marker board based on each of the identified image data and point cloud data; determining a translation vector for calibration between the camera sensor and the LiDAR sensor, based on a radius of the hole recognized based on the image data and a radius of the hole recognized based on the point cloud data; and performing calibration between the camera sensor and the LiDAR sensor by projecting the point cloud data of the LiDAR sensor onto the image data of the camera sensor using the determined translation vector.

The method may further include estimating unique calibration parameters of the camera sensor using a checker board, the unique calibration parameters corresponding to intrinsic characteristics including a focal length, a distortion, and an image center of the camera sensor, wherein identifying the image data and identifying the point cloud data may include identifying image data and point cloud data corresponding to a field of view (FOV) of the camera sensor extracted using the estimated unique calibration parameters, respectively.

Recognizing the hole may include recognizing the hole in the marker board based on an amount of change in pixel values for pixels included in the identified image data.

Recognizing the hole may include recognizing the hole in the marker board by removing, among points included in the identified point cloud data, points constituting a line having a predetermined angle.

Determining the translation vector may include determining the translation vector based on a first distance from the camera sensor to the marker board and a second distance from the LiDAR sensor to the marker board.

The first and second distances may be determined using a focal length of the camera sensor, a radius of the hole in the marker board, and a radius of the hole recognized through each of the camera sensor and the LiDAR sensor.

Performing the calibration may include taking into account a movement translation in projecting the point cloud data of the LiDAR sensor onto the image data of the camera sensor using the determined translation vector.

The method may further include detecting a target using the calibrated camera sensor and LiDAR sensor.

A method for data fusion between calibrated heterogeneous sensors according to another embodiment of the present disclosure may include identifying image data and point cloud data for a search area by each of a camera sensor and a LiDAR sensor that are calibrated using a marker board having a hole; recognizing a translation vector determined through calibrating of the camera sensor and the LiDAR sensor; and projecting the point cloud data of the LiDAR sensor onto the image data of the camera sensor using the recognized translation vector to fuse the identified image data and point cloud data.

The translation vector may be determined based on a first distance from the camera sensor to the marker board and a second distance from the LiDAR sensor to the marker board.

The first and second distances may be determined using a focal length of the camera sensor, a radius of the hole in the marker board, and a radius of the hole recognized through each of the camera sensor and the LiDAR sensor.

The method may further include evaluating accuracy of fusion data obtained through fusing of the identified image data and point cloud data.

Evaluating the accuracy may include evaluating the accuracy of the fusion data based on a correspondence degree between positions of pixels corresponding to a reference area of the identified image data in the fusion data and positions of points of the point cloud data corresponding to the reference area.

Evaluating the accuracy may include evaluating the accuracy of the fusion data by visualizing the points of the point cloud data in the fusion data, and by using a correspondence degree between color values of the visualized points and pixel values of the identified image data.

Evaluating the accuracy may include evaluating the accuracy of the fusion data by determining an estimated distance to a target using points of the point cloud data in the fusion data, which are aligned with pixels corresponding to an image of the target, and by comparing the determined estimated distance with a measured distance to the target measured through an existing target recognition algorithm.

An apparatus for data fusion between heterogeneous sensors according to another embodiment of the present disclosure may include a processor configured to perform data fusion between a camera sensor and a LiDAR sensor, wherein the processor may be configured to identify image data and point cloud data for a search area by each of the camera sensor and the LiDAR sensor that are calibrated using a marker board having a hole; recognize a translation vector determined through calibrating of the camera sensor and the LiDAR sensor; and project the point cloud data of the LiDAR sensor onto the image data of the camera sensor using the recognized translation vector to fuse the identified image data and point cloud data.

The processor may be configured to evaluate accuracy of fusion data obtained through fusing of the identified image data and point cloud data.

The processor may be configured to evaluate the accuracy of the fusion data based on a correspondence degree between positions of pixels corresponding to a reference area of the identified image data in the fusion data and positions of points of the point cloud data corresponding to the reference area.

The processor may be configured to evaluate the accuracy of the fusion data by visualizing the points of the point cloud data in the fusion data, and by using a correspondence degree between color values of the visualized points and pixel values of the identified image data.

The processor may be configured to evaluate the accuracy of the fusion data by determining an estimated distance to a target using points of the point cloud data in the fusion data, which are aligned with pixels corresponding to an image of the target, and by comparing the determined estimated distance with a measured distance to the target measured through an existing target recognition algorithm.

Advantageous Effects of Invention

According to the embodiments of the present disclosure, it is possible to improve accuracy of detecting distant objects regardless of mounting positions of the heterogeneous sensors by performing calibration between the heterogeneous sensors through the 3D marker board having the hole.

In addition, according to the embodiments of the present disclosure, it is possible to generate fusion data by fusing data identified by each of the calibrated heterogeneous sensors, and to evaluate accuracy of the generated fusion data.

BEST MODE FOR CARRYING OUT THE INVENTION

Hereinafter, embodiments of the present disclosure are described in detail with reference to the accompanying drawings. However, various changes may be made to the embodiments, and thus the scope of the present disclosure is not limited to these embodiments. It should be understood that all changes, equivalents, or substitutes to the embodiments fall within the scope of the present disclosure.

The terms used throughout the embodiments are for the purpose of description only, and should not be construed as limiting. The singular expressions "a," "an," and "the" include plural expressions unless the context clearly dictates otherwise. It should be understood that the terms "comprises," "comprising," "includes," "including," "containing," "has," "having" or any other variation thereof specify the presence of features, integers, steps, operations, elements, components, or combinations thereof described herein, but do not preclude the presence or addition of one or more other features, integers, steps, operations, elements, components, or combinations thereof.

Unless defined otherwise, all terms used herein, including technical or scientific terms, have the same meaning as commonly understood by those skilled in the art. It will be further understood that terms such as those defined in commonly used dictionaries, should be interpreted as having a meaning that is consistent with their meaning in the context of the relevant art, and will not be interpreted in an ideal or overly formal sense unless expressly so defined herein.

In addition, when describing embodiments with reference to the accompanying drawings, the same reference numbers will be used throughout the drawings to refer to the same or like parts, and a repeated description thereof will be omitted. In relation to describing the embodiments, when the detailed description of the relevant known technology is determined to unnecessarily obscure the subject matter of the embodiments, the detailed description thereof will be omitted.

Figure 1:
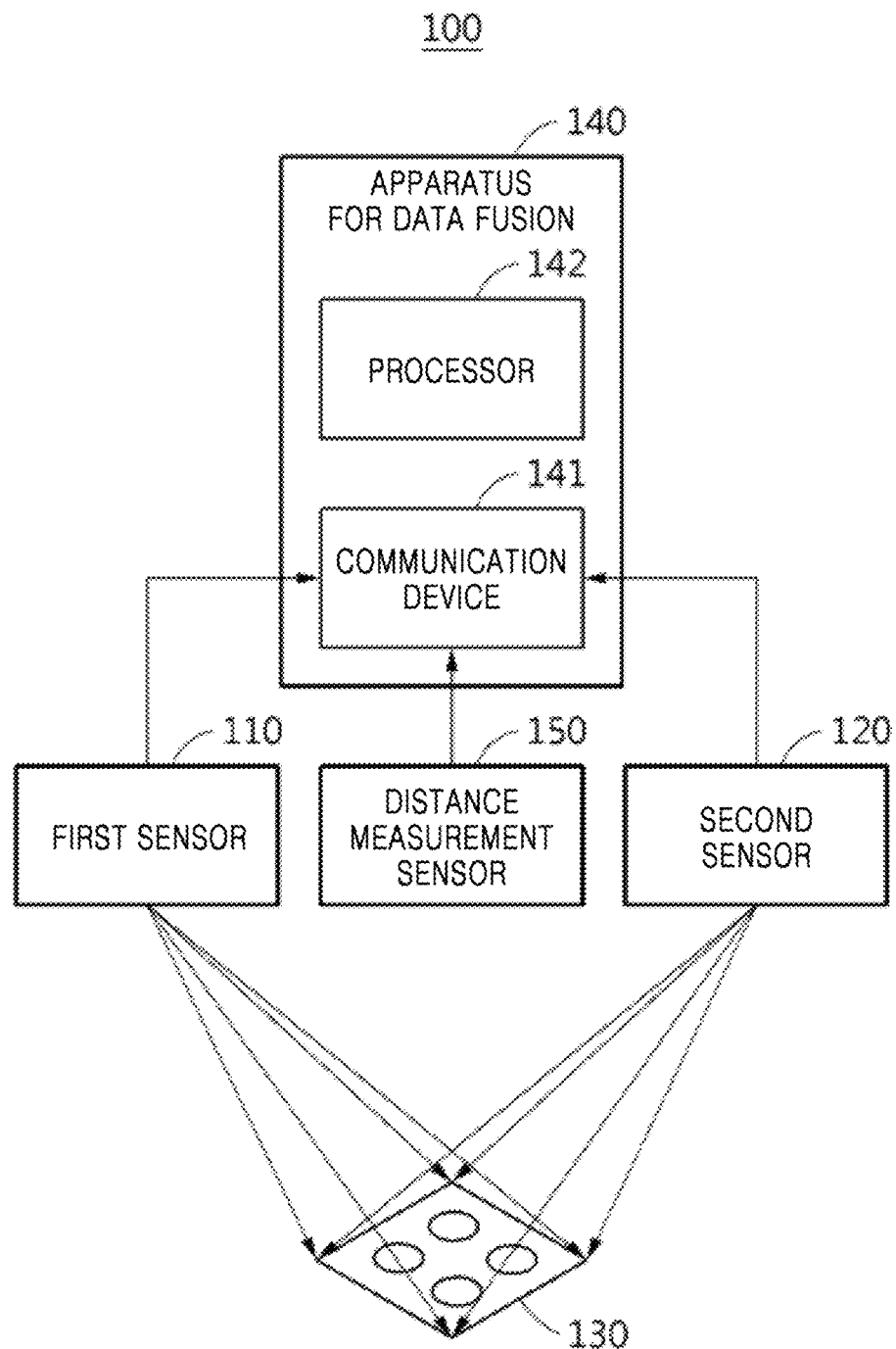
FIG. 1 is a diagram illustrating a system for data fusion between heterogeneous sensors according to an embodiment of the present disclosure.

FIG. 1 is a diagram illustrating a system for data fusion between heterogeneous sensors according to an embodiment of the present disclosure.

Referring to FIG. 1, a system for data fusion between heterogeneous sensors 100 according to an embodiment of the present disclosure may include a first sensor 110, a second sensor 120 different from the first sensor 110, a marker board 130, and an apparatus for data fusion 140. As an example, the first sensor 110 and the second sensor 120 may be one of various sensors, such as a camera sensor, a LiDAR sensor, or a laser sensor.

In order to fuse data collected by the heterogeneous sensors as described above, coordinate translation, that is, calibration, between frames of each of the sensors should be performed. To this end, unique features should be identified based on each of the data collected by the heterogeneous sensors, and a correspondence relationship between the heterogeneous sensors should be established based on the identified unique features.

Figure 2:
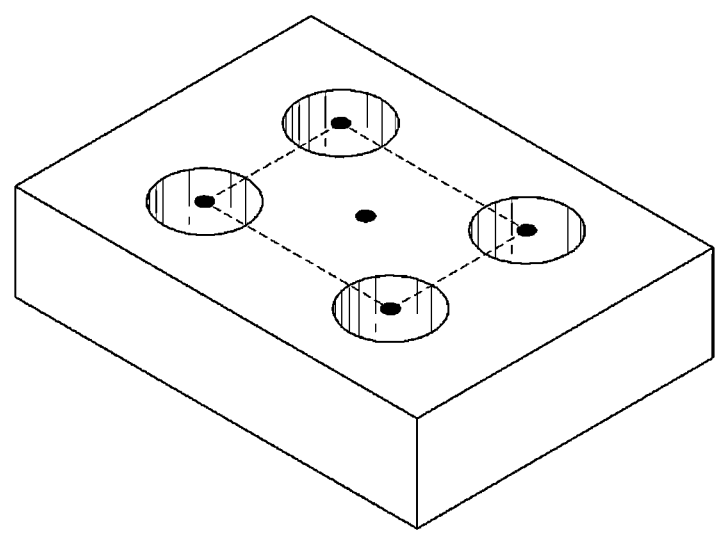
FIG. 2 is a diagram illustrating an example of a marker board according to an embodiment of the present disclosure.

In order to provide a method for data fusion between the heterogeneous sensors, an embodiment of the present disclosure provides a method for performing calibration between the heterogeneous sensors by using a marker board 130 having a plurality of holes as shown in FIG. 2. At this time, the holes 131 to 134 in the marker board 130 may be circular, but are not limited thereto, and thus may have various shapes, for example, polygons. Further, although four holes 131 to 134 are present in the marker board 130 of FIG. 2, the number of holes shown FIG. 2 is only one example, and the holes may be present in various numbers in the marker board 130.

A communication device 141 in the apparatus for data fusion 140 may receive, from the first sensor 110 and the second sensor 120, data of the marker board 130 photographed by the first sensor 110 and the second sensor 120. To this end, the communication device 141 may be in wired or wireless connection with the first sensor 110 and the second sensor 120, and may receive data from both sensors 110 and 120.

In addition, a processor 142 in the apparatus for data fusion 140 may identify data received through the communication device 141, and recognize the holes in the marker board 130 based on the identified data. Then, the processor 142 may determine a translation vector for calibration between the first sensor 110 and the second sensor 120, based on a radius of the hole recognized based on the identified data from the first sensor 110 and a radius of the hole recognized based on the identified data from the second sensor 120.

More specifically, a coordinate system of the first sensor 110 and a coordinate system of the second sensor 120 may be matched through the translation vector, and the translation vector may be determined based on a relative position difference between the first sensor 110 and the second sensor 120, that is, a distance between the first sensor 110 and the marker board 130 and a distance between the second sensor 120 and the marker board 130. The method for determining the translation vector will be described in more detail with reference to FIG. 4 described below.

Then, the processor 142 may perform calibration between the heterogeneous sensors using the determined translation vector to enable matching between the coordinate system of the first sensor 110 and the coordinate system of the second sensor 120, and may thus fuse the identified data from the first sensor 110 and the identified data from the second sensor 120.

The conventional method for calibration between the heterogeneous sensors may cause a measurement error whenever there is a positon change of the marker board or a position change between the sensors, or may generate different results in recognizing a distant target depending on the unique characteristics of the sensors. Further, since the recognition accuracy of the targets in the above-described conventional method may be increased by mounting the heterogeneous sensors as close to each other as possible and then performing calibration between the heterogeneous sensors, the conventional method may recognize only the targets within a relatively close distance. As a result, the conventional method is not suitable for an autonomous driving system or the like that must recognize distant targets.

However, the method for calibration between the heterogeneous sensors according to the embodiments of the present disclosure may recognize distant targets with high accuracy regardless of mounting positions between the heterogeneous sensors by performing calibration using the marker board 130 having the hole. As a result, the method according to the embodiments of the present disclosure may be widely used in an autonomous driving system or the like.

Additionally, the system for data fusion 100 according to the embodiments of the present disclosure may provide a method for evaluating the accuracy of the fusion data through calibration between the heterogeneous sensors, and may further include a separate distance measurement sensor 150 to perform the method. The method for evaluating the accuracy of the fusion data will be described in detail below with reference to FIGS. 6 to 9.

Figure 3:
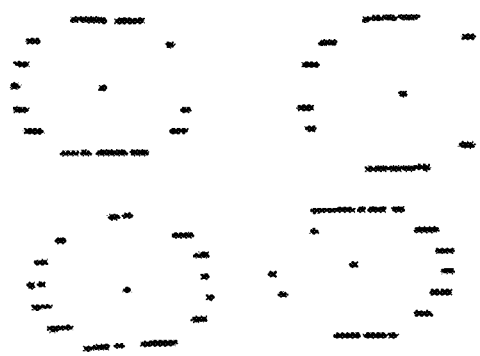
FIG. 3 is a diagram illustrating an example of extracting a hole based on data of heterogeneous sensors according to an embodiment of the present disclosure.
Figure 3:
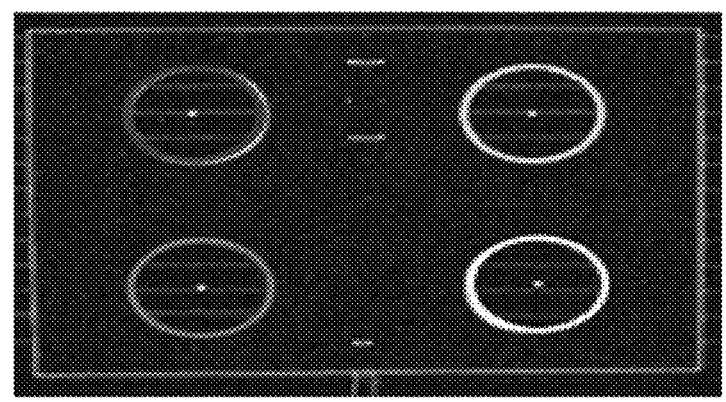

FIG. 3 is a diagram illustrating an example of recognizing the hole based on data of the heterogeneous sensors according to an embodiment of the present disclosure.

An embodiment of the present disclosure provides a method for calibration between the camera sensor and the LiDAR sensor among various methods for calibration between the heterogeneous sensors. Accordingly, in order to perform calibration between the camera sensor and the LiDAR sensor, it is first necessary to recognize the hole in the marker board 130 based on data of the marker board 130 photographed by each of the camera sensor and the LiDAR sensor.

First, when one of the heterogeneous sensors is the camera sensor, the processor 142 may estimate unique calibration parameters of the camera sensor using a checker board, wherein the unique calibration parameters correspond to intrinsic characteristics, such as focal length, a distortion, and an image center, of the camera sensor. Estimating is needed to fuse image data and point cloud data collected by each of the heterogeneous sensors, that is, the camera sensor and the LiDAR sensor. As a result of performing calibration using the unique calibration parameters of the camera sensor, the processor 142 may obtain, for example, a camera matrix, a distortion coefficient, and a camera projection matrix. At this time, the camera projection matrix may be obtained from the product of an intrinsic matrix and an extrinsic matrix, as shown in Equation 1 below:

$$P = \overset{\text{Intrinsic Matrix}}{I} \times \overset{\text{Extrinsic Matrix}}{[R \mid T]} \quad (1)$$

wherein $$I = \begin{bmatrix} f_x & s & x_0 \\ 0 & f_y & y_0 \\ 0 & 0 & 1 \end{bmatrix},$$

and the intrinsic matrix I may be decomposed into a product of a 2D translation matrix, a 2D scaling matrix, and a 2D shear matrix, as shown in Equation 2 below:

$$I = \begin{bmatrix} 1 & 0 & c_x \\ 0 & 1 & c_y \\ 0 & 0 & 1 \end{bmatrix} \times \begin{bmatrix} f_x & 0 & 0 \\ 0 & f_y & 0 \\ 0 & 0 & 1 \end{bmatrix} \times \begin{bmatrix} 1 & s/f_x & 0 \\ 0 & 1 & 0 \\ 0 & 0 & 1 \end{bmatrix} \quad (2)$$

wherein $c_x$ and $c_y$ are centers of the image data, $f_x$ and $f_y$ are focal lengths of pixel units, and s is shear modulus.

FIG. 3(a) illustrates an example in which the processor 142 recognizes the hole in the marker board 130 based on point cloud data identified by sensing the marker board 130 using the LiDAR sensor.

Based on a field of view (FOV) of the camera sensor, the processor 142 may segment the point cloud data collected by the LiDAR sensor. At this time, the field of view of the camera sensor may be extracted using the unique calibration parameters of the camera sensor. The segmented point cloud data may include the sensed marker board 130 as well as various objects around the marker board 130.

The processor 142 may identify a plane having the same normal and curvature by calculating normals and curvatures of all objects, and may thus extract only the marker board 130 based on the point cloud data corresponding to the field of view of the camera sensor. At this time, the identified plane may correspond to the marker board 130, and the processor 142 may extract only the identified plane, and remove the remaining parts.

The processor 142 may recognize the hole in the marker board 130 by removing, from the point cloud data included in the extracted plane, points constituting a line having a predetermined angle. More specifically, the processor 142 may find, among points mapped on the plane, points constituting a line having the same angle, and may extract the line having the same angle through a line segment operation and then remove the points constituting that line. Through this operation, the processor 142 may leave only points constituting a circle corresponding to the hole on the plane corresponding to the marker board 130.

Then, the processor 142 may determine a threshold value of a radius and a center point of the circle to recognize the hole in the marker board 130, and may identify the hole having a predetermined radius among various detected polygons (including the circle). As an example, in an embodiment of the present disclosure, for use in an autonomous driving system, the threshold value of the radius of the circle may be determined in the range of 20 to 22 cm, and four circles having the radius within the threshold value range may be recognized as shown in FIG. 3(a).

FIG. 3(b) illustrates an example in which the processor 142 recognizes the hole in the marker board 130 based on image data identified by sensing the marker board 130 using the camera sensor.

The processor 142 may extract boundaries of all objects including the entire marker board 130 based on the collected image data corresponding to the field of view of the camera sensor extracted using the unique calibration parameters of the camera sensor, and separately extract only an area of the hole among them. At this time, the image data from which the boundaries of all objects are extracted may be in RGB form, and the processor 142 may translate the image data extracted in the RGB form into the image data in gray scale form.

The processor 142 may recognize the hole in the marker board 130 based on an amount of change in pixel values for pixels included in the image data in the gray scale form. Specifically, the processor 142 may extract the marker board 130 and edges of the hole in the marker board 130 by using a 3×3 matrix as a filter for the image data in the gray scale form. At this time, the processor 142 may apply the filter to all pixels included in the image data in the gray scale form, and may extract boundary edges of the hole by comparing the pixel values before and after in each direction based on any one point in the image data and detecting an amount of change in the pixel values.

The processor 142 may find, among the extracted edges, all edges of the circles which fall within a predetermined range of the threshold value of the radius and the center point of the circle, and may extract only circles having edges with a high boundary strength among the found edges of the circles based on a predetermined gradient threshold value of the boundary. The gradient threshold value of the boundary may be determined by a user based on an image for the circle having the found edges. The processor 142 may extract only circles having sharper edges among the found edges of the circles by using the determined gradient threshold value of the boundary. As an example, according to an embodiment of the present disclosure, as shown in FIG. 3(b), the processor 142 may recognize four circles based on the image data identified by the camera sensor.

Figure 4:
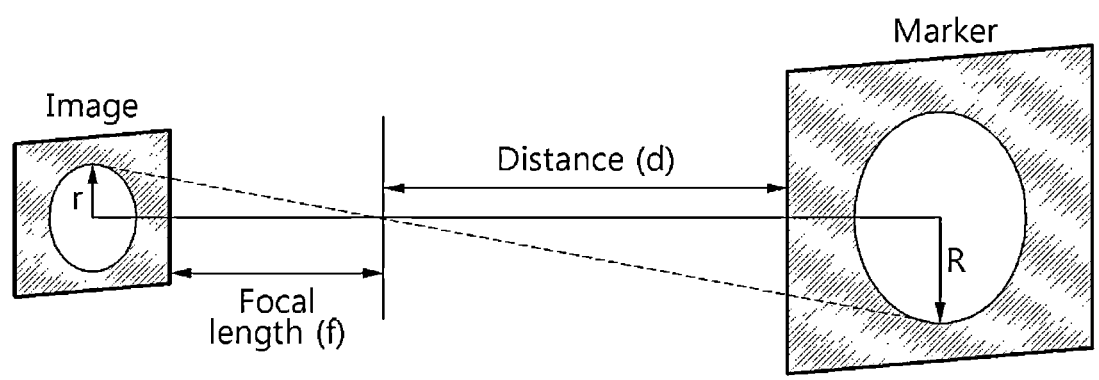
FIG. 4 is a diagram illustrating a method for determining a translation vector according to an embodiment of the present disclosure.

FIG. 4 is a diagram illustrating a method for determining the translation vector according to an embodiment of the present disclosure.

When the holes in the marker board 130 are recognized based on data identified by the camera sensor and the LiDAR sensor as shown in FIG. 3, the processor 142 may perform calibration for matching the coordinate system of the camera sensor and the coordinate system of the LiDAR sensor using the recognized holes. According to an embodiment of the present disclosure, since the camera sensor and the LiDAR sensor are mounted in the same direction in three axes on the autonomous vehicle, only the translation difference between the heterogeneous sensors is considered, not the rotation difference therebetween in performing calibration between the heterogeneous sensors, such that the amount of computation may be minimized.

That is, the processor 142 may calculate intrinsic parameters (that is, the unique calibration parameters of the camera sensor) and extrinsic parameters (that is, translation vectors) of two sensors. Subsequently, by projecting the points of the point cloud data identified by the LiDAR sensor onto the image data identified by the camera sensor as shown in Equation 3 below, the processor 142 may perform calibration between the heterogeneous sensors to generate the fusion data:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} 1 & 0 & 0 & t_x \\ 0 & 1 & 0 & t_y \\ 0 & 0 & 1 & t_z \end{bmatrix} \begin{bmatrix} x \\ y \\ z \\ 1 \end{bmatrix} \quad (3)$$

At this time, the translation vectors corresponding to the extrinsic parameters may be determined based on distances from each of the camera sensor and the LiDAR sensor to the marker board 130. First, the processor 142 may calculate $t_z$, before calculating $t_x$ and $t_y$ of the translation vectors $t_x, t_y, t_z$.

At this time, $t_z$ may be calculated using a first distance $d_1$ from the LiDAR sensor to the marker board 130 and a second distance $d_2$ from the camera sensor to the marker board 130, as shown in Equation 4 below:

$$t_z = d_1 - d_2 \quad (4)$$

At this time, the distance d from each sensor to the marker board 130 may be calculated using the focal length f of the camera sensor, and the radii $r_1, r_2$ of the holes recognized based on each of the point cloud data and the image data, as shown in Equation 5 below:

$$d = f \times \frac{R}{r} \quad (5)$$

Then, the processor 142 may calculate the remaining translation vectors $t_x$ and $t_y$ using the calculated $t_z$, as shown in Equation 6 below:

$$t_x = \frac{(t_z + z) \cdot (x - o_x)}{f} \text{ and } t_y = \frac{(t_z + z) \cdot (y - o_y)}{f} \quad (6)$$

By projecting the point cloud data of the LiDAR sensor onto the image data of the camera sensor using the determined translation vectors $t_x, t_y, t_z$, the processor 142 may perform calibration between the camera sensor and the LiDAR sensor to generate the fusion data.

Figure 5:
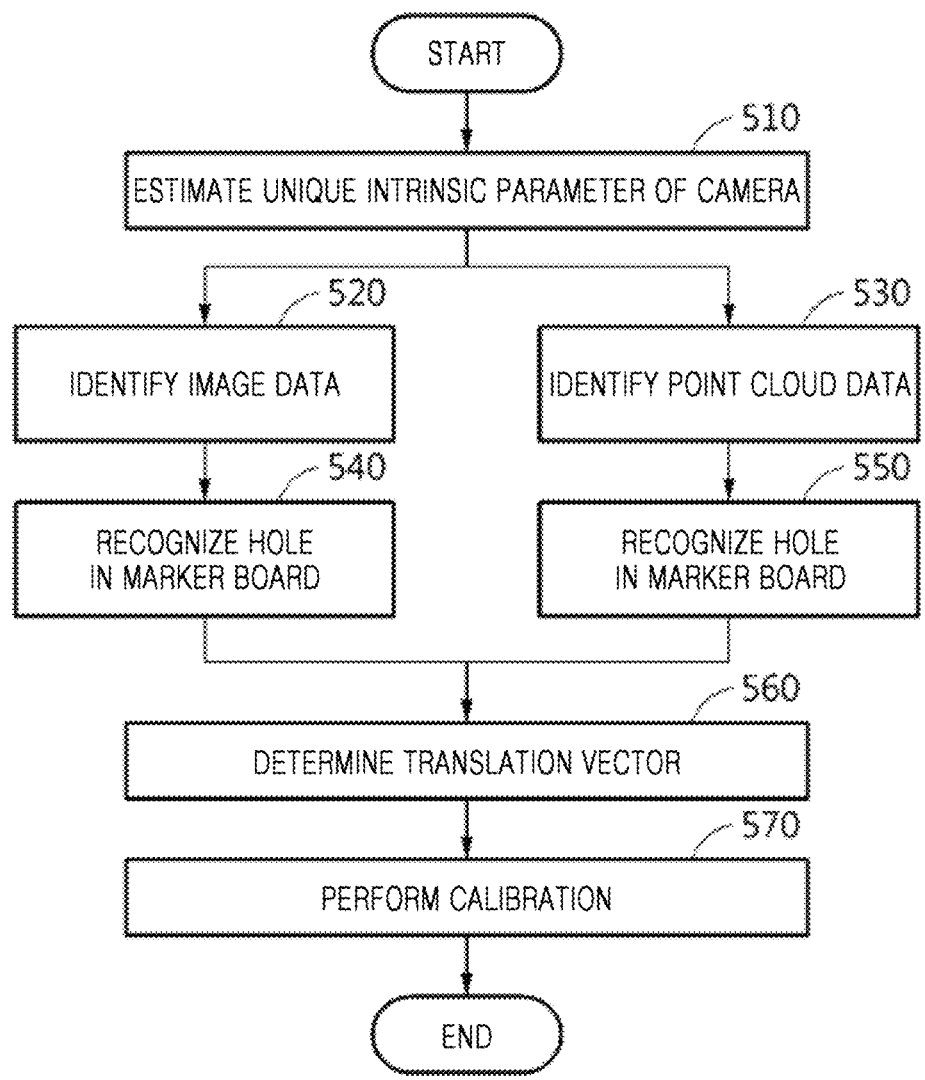
FIG. 5 is a diagram illustrating a method for data fusion between heterogeneous sensors according to an embodiment of the present disclosure.

FIG. 5 is a diagram illustrating a method for data fusion between the heterogeneous sensors according to an embodiment of the present disclosure.

At S510, the apparatus for data fusion 140 in the system for data fusion 100 may estimate the unique calibration parameters, such as the focal length, the distortion, and the image center, of the camera sensor. At this time, the apparatus for data fusion 140 may estimate the unique calibration parameters of the camera sensor using the checker board.

The apparatus for data fusion 140 may obtain, for example, the camera matrix, the distortion coefficient, and the camera projection matrix by performing calibration of the camera sensor using the unique calibration parameters of the camera sensor, and may use these to fuse the image data and the point cloud data identified by the camera sensor and the LiDAR sensor respectively.

At S520, the apparatus for data fusion 140 may identify the image data of the marker board 130 photographed by the camera sensor. At S530, the apparatus for data fusion 140 may identify the point cloud data of the marker board 130 sensed by the LiDAR sensor. At this time, the hole in the marker board 130 may be circular, but is not limited thereto, and thus may have various shapes, for example, polygons, and may be present in various numbers.

At S540, the apparatus for data fusion 140 may recognize the hole in the marker board 130 based on the image data identified by photographing the marker board 130 using the camera sensor. The apparatus for data fusion 140 may extract the boundaries of all objects including the entire marker board 130 based on the collected image data corresponding to the field of view of the camera sensor extracted using the unique calibration parameters of the camera sensor, and may separately extract only an area of the hole from the boundaries.

At this time, the image data from which the boundaries of all objects are extracted may be in RGB form, and the apparatus for data fusion 140 may translate the image data extracted in the RGB form into the image data in gray scale form.

The apparatus for data fusion 140 may recognize the hole in the marker board 130 based on an amount of change in pixel values for pixels included in the translated image data in the gray scale form. Specifically, the apparatus for data fusion 140 may extract the marker board 130 and edges of holes in the marker board 130 by using the 3×3 matrix as the filter for the image data in the gray scale form. At this time, the apparatus for data fusion 140 may apply the filter to all pixels included in the image data in the gray scale form, and may extract the boundary edges of the hole by comparing the pixel values before and after in each direction based on any one point in the image data and detecting an amount of change in the pixel values.

The apparatus for data fusion 140 may find, among the extracted edges, all edges of circles which fall within a predetermined range of the threshold value of the radius and the center point of the circle, and may extract only circles having edges with a high boundary strength among the found edges of the circles based on a predetermined gradient threshold value of the boundary. The gradient threshold value of the boundary may be determined by a user based on an image for the circle having the found edges. The apparatus for data fusion 140 may extract only circles having sharper edges among the edges of the found circles by using the determined gradient threshold value of the boundary.

At S550, the apparatus for data fusion 140 may recognize the hole in the marker board 130 based on the point cloud data identified by sensing the marker board 130 using the LiDAR sensor. Based on the field of view (FOV) of the camera sensor, the apparatus for data fusion 140 may segment the point cloud data collected by the LiDAR sensor. At this time, the field of view of the camera sensor may be extracted using the unique calibration parameters of the camera sensor. The segmented point cloud data may include the sensed marker board 130 as well as various objects around the marker board 130.

The apparatus for data fusion 140 may identify the plane having the same normal and curvature by calculating the normals and the curvatures of all objects, and then extract only the marker board 130 based on the point cloud data corresponding to the field of view of the camera sensor. At this time, the identified plane may correspond to the marker board 130, and the apparatus for data fusion 140 may extract only the identified plane and remove the remaining planes.

The apparatus for data fusion 140 may recognize the hole in the marker board 130 by removing, from the point cloud data included in the extracted plane, points constituting the line having the predetermined angle. More specifically, the apparatus for data fusion 140 may find, among points mapped on the plane, points constituting a line having the same angle, and may extract the line having the same angle through the line segment operation and then remove the points mapped to that line. Through this operation, the apparatus for data fusion 140 may leave only points of the circle corresponding to the hole on the plane corresponding to the marker board 130.

Then, the apparatus for data fusion 140 may determine the threshold value of the radius and the center point of the circle to recognize the hole in the marker board 130, and may identify the hole having a predetermined radius among various detected polygons (including the circle).

At S560, the apparatus of data fusion 140 may determine the translation vector based on the distances from each of the camera sensor and the LiDAR sensor to the marker board 130. At this time, the first distance $d_1$ from the LiDAR sensor to the marker board 130 and the second distance $d_2$ from the camera sensor to the marker board 130 may be calculated using the focal length f of the camera sensor, and the radii $r_1, r_2$ of the hole recognized based on the point cloud data and the image data respectively.

At S570, the apparatus of data fusion 140 may perform calibration between the camera sensor and the LiDAR sensor by projecting the point cloud data of the LiDAR sensor onto the image data of the camera sensor using the determined translation vector, and thereby generate the fusion data. In addition, the apparatus of data fusion 140 may more accurately detect distant targets using the calibrated camera sensor and LiDAR sensor.

Figure 6:
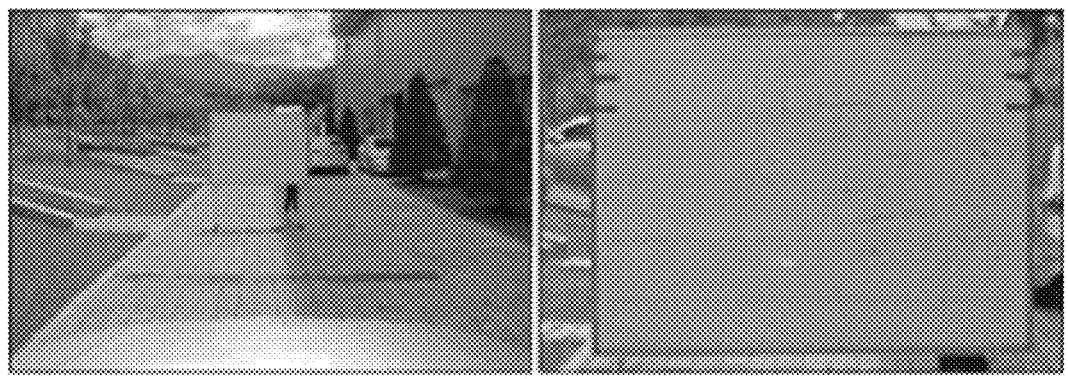
FIG. 6 is a diagram illustrating a first embodiment of a method for evaluating accuracy of fusion data, performed by an apparatus for data fusion according to an embodiment of the present disclosure.
Figure 6:
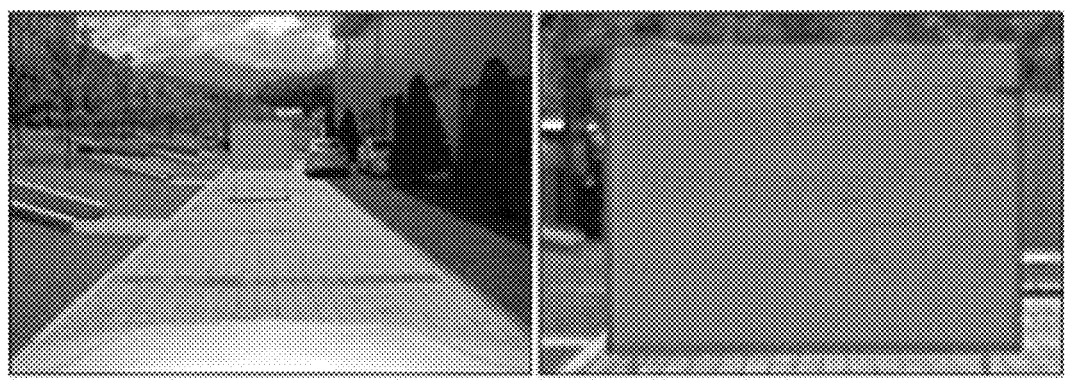
Figure 6:
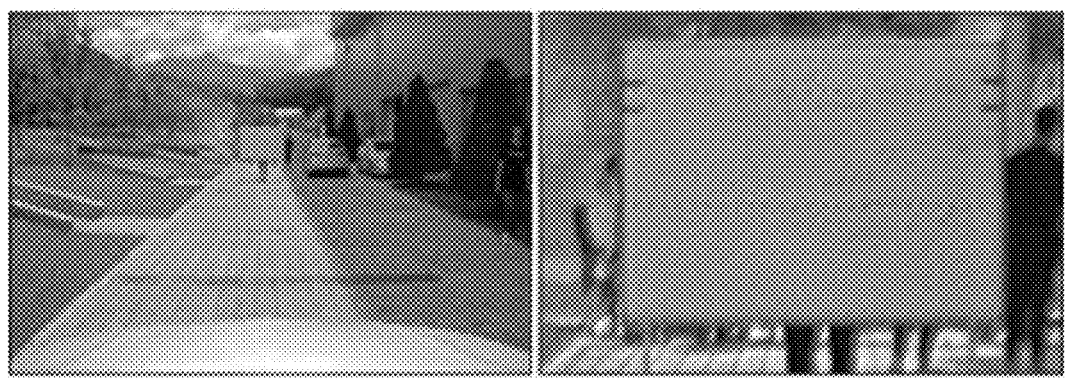
Figure 7:
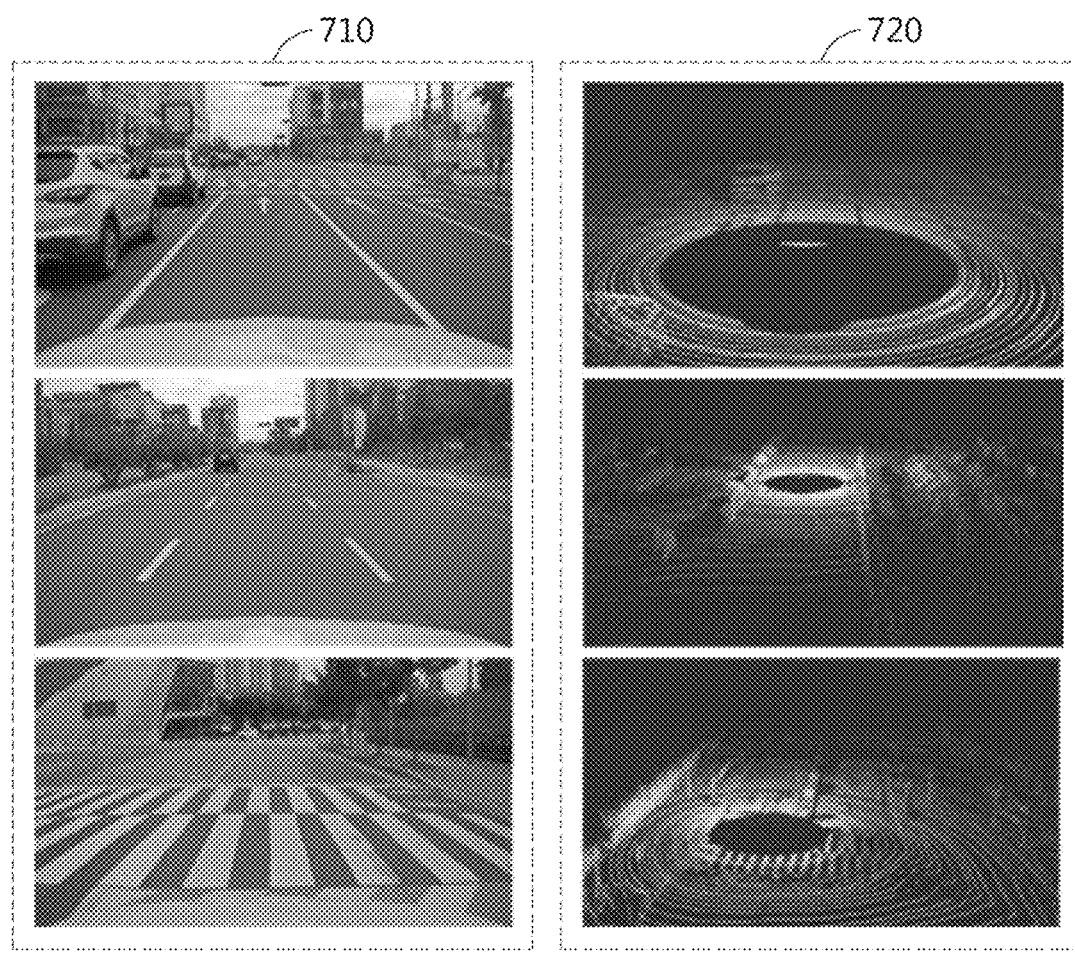
FIG. 7 is a diagram showing image data of a camera sensor and point cloud data of a LiDAR sensor, both of which are identified in consideration of various scenarios according to an embodiment of the present disclosure.

FIG. 6 is a diagram illustrating a first embodiment of a method for evaluating the accuracy of the fusion data, performed by the apparatus for data fusion according to an embodiment of the present disclosure.

An embodiment of the present disclosure provides a method of evaluating, by using a depth sensing context of a driving vehicle, performance of the method for data fusion between the heterogeneous sensors. When detecting the surrounding environment of the autonomous vehicle based on the current requirements thereof, the method for data fusion may be evaluated in consideration of various aspects.

In addition, an embodiment of the present disclosure may provide a criterion for fusing data identified by the heterogeneous sensors while the autonomous vehicle equipped with the predetermined platforms is actually driving on a road, and for evaluating the accuracy of the fusion data.

As an example, the apparatus for data fusion 140 according to the embodiments of the present disclosure performed an evaluation test for accuracy of fusing data identified according to the movement of the autonomous vehicle while the LiDAR sensor and the camera sensor were arranged on the platform of the autonomous vehicle. The platform of the autonomous vehicle was equipped with, for example, a Velodyne HDL 64E-S2 LiDAR sensor and a Sekonix SF3321 camera sensor, and data was obtained by these sensors. By correcting the LiDAR sensor and the camera sensor before fusing the data identified by these sensors, the unique calibration parameters (the intrinsic and extrinsic parameters) of the camera sensor may be estimated.

The evaluation test was performed using the platform of the autonomous vehicle and data obtained through the sensors arranged thereon. Data was obtained from the vehicle driving at 30 to 40 km/h in various road environment scenarios. That is, the camera sensor obtained the image data at 40 to 60 frames per second, and the LiDAR sensor obtained the point cloud data at 20 frames per second. The image data captured by the camera sensor and the point cloud data sensed by the LiDAR sensor are shown at the left side 710 and the right side 720 of FIG. 7, respectively.

A method of estimating the distance to moving and stationary objects is an essential technology for autonomous driving. Evaluating the accuracy of the fusion data may be verified by considering factors related to the distance to the target object.

When the distance to the target object changes as shown in FIG. 6, the apparatus for data fusion 140 may measure the accuracy of the fusion data and compare the measured accuracy to an average error. Specifically, the apparatus for data fusion 140 may evaluate the accuracy of the fusion data by analyzing how many points of the LiDAR sensor are mapped and aligned to the reference area of the image data identified by the camera sensor.

As an example, Table 1 shows the results of analyzing the fusion of the pixels of the image data identified by the camera sensor and the points of the point cloud data identified by the LiDAR sensor by testing the same plane marker board at different distances. In this evaluation method, tests were performed at distances of 20 m (a), 30 m (b), and 40 m (c) from the vehicle, respectively, and the same plane board of 1 m×1.5 m was used.

The reference area in the image data of the camera sensor was indicated using a separate tape on the corner of the plane board, and an alignment degree was measured by finding points in the point cloud data of the LiDAR sensor that match the reference area indicated by the tape, so as to evaluate the accuracy of the fusion data.

More specifically, the apparatus for data fusion 140 may fuse data identified by the camera sensor and the LiDAR sensor, and may then evaluate the accuracy of the fusion data based on a correspondence degree between the positions of each pixel of the reference area included in the image data and the positions of the points of the point cloud data corresponding to that reference area.

Referring to Table 1, as a result of analyzing statistics after the evaluation test was performed, it can be seen that the average error between the positions of pixels of the image data corresponding to the reference area and the positions of the points of the point cloud data corresponding to that reference area is lower than 35 pixels, which corresponds to the tolerance range of the high-resolution camera. That is, it can be seen that the accuracy of the fusion data may be high through the apparatus for data fusion 140 according to the embodiments of the present disclosure.

TABLE 1

| Distance | Position | Camera (Pixel index) | | LiDAR (Pixel index) | | Pixel Difference | |
| --- | --- | --- | --- | --- | --- | --- | --- |
| | | x | y | x | y | x | y |
| 20 meters | Corner 1 | 733 | 363 | 729 | 361 | 4 | 2 |
| | Corner 2 | 1096 | 360 | 1082 | 348 | 14 | 12 |
| 30 meters | Corner 1 | 847 | 398 | 836 | 406 | 11 | 8 |
| | Corner 2 | 1011 | 398 | 986 | 384 | 25 | 14 |
| 40 meters | Corner 1 | 847 | 409 | 802 | 383 | 45 | 26 |
| | Corner 2 | 1013 | 409 | 982 | 400 | 31 | 9 |

Figure 8:
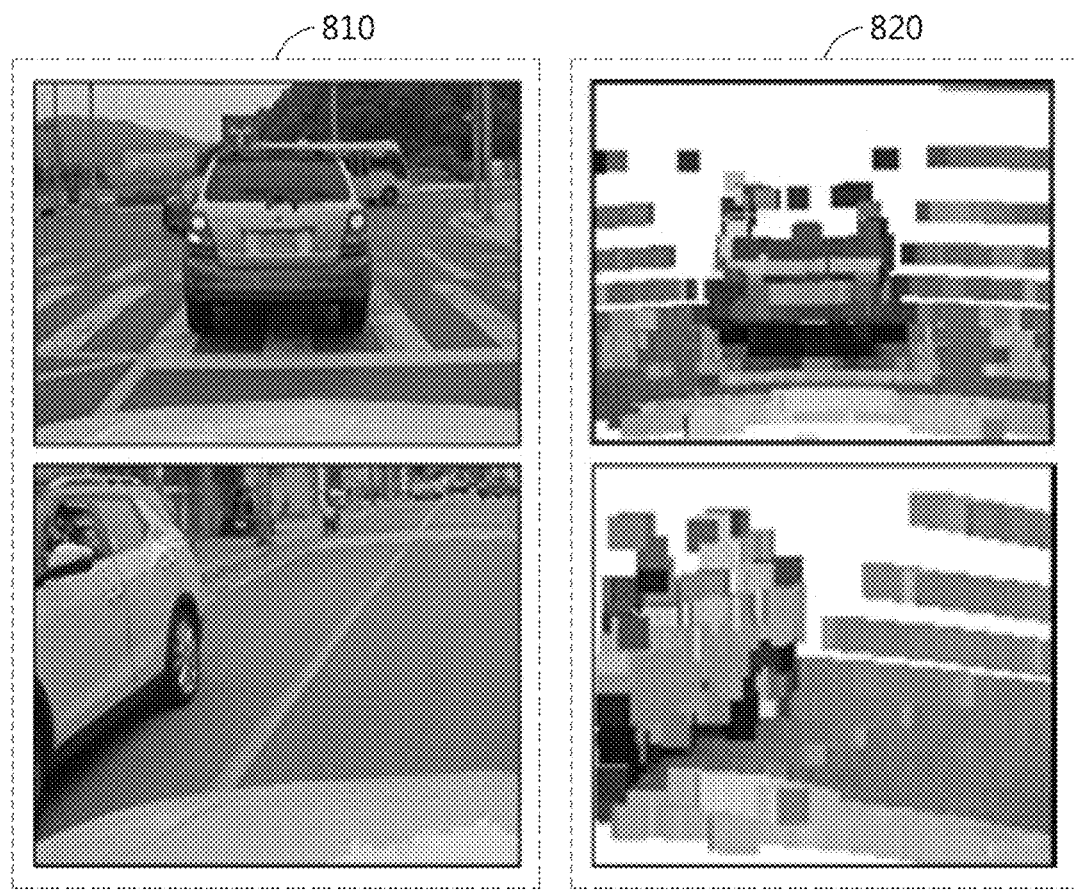
FIG. 8 is a diagram illustrating a second embodiment of a method for evaluating accuracy of fusion data, performed by an apparatus for data fusion according to an embodiment of the present disclosure.

FIG. 8 is a diagram illustrating a second embodiment of a method for evaluating the accuracy of the fusion data, performed by the apparatus for data fusion according to an embodiment of the present disclosure.

The apparatus for data fusion 140 may evaluate the accuracy of the fusion data by visualizing the points of the point cloud data in the fusion data, and by calculating the alignment function between the pixels and the points using a correspondence degree between color values of the visualized points and pixel values of the identified image data.

More specifically, the apparatus for data fusion 140 may evaluate the accuracy of the fusion data by measuring a ratio in which a pixel value of a specific object in the image data of the camera sensor matches a predetermined intensity value-based RGB point value.

As an example, as shown in the right side 820 of FIG. 8, the apparatus for data fusion 140 may translate the points of the point cloud data into the RGB-based intensity values for visualization. First, the apparatus for data fusion 140 may translate 3D point cloud data identified by the LiDAR sensor into 2D point cloud data, and may replace the intensity value of the 2D point cloud data with a color value for a pixel of 2D image data at the same position as the translated 2D point cloud data. At this time, an alignment score between the pixel and the point may be calculated based on a ratio of the number of pixels of the image data accurately mapped to points of the point cloud data translated into RGB.

Referring to FIG. 8, the image data 810 and the fusion data 820 visualizing the point clouds, which represent the same object, were accurately aligned in the same coordinate system. Table 2 shows the analysis of accuracy statistics of fusion data based on data obtained through actual road driving. Further, Table 2 shows the result of accurately finding the same object with an average of about 89% by using the fusion data generated by the apparatus for data fusion 140 according to the embodiments of the present disclosure.

TABLE 2

| Scene | Object ID | Alignment Score (in %) |
|---|---|---|
| Scene 1 | Object 1 | 91 |
|  | Object 2 | 86 |

Figure 9:
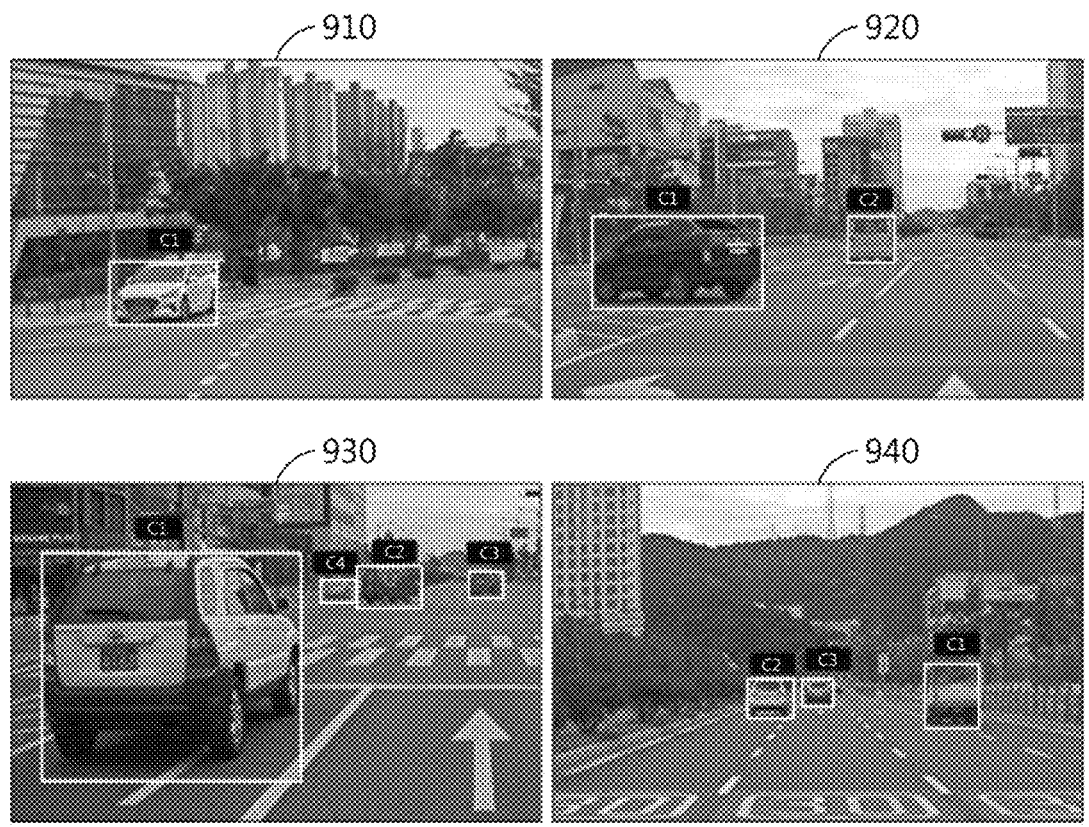
FIG. 9 is a diagram illustrating a third embodiment of a method for evaluating accuracy of fusion data, performed by an apparatus for data fusion according to an embodiment of the present disclosure.

FIG. 9 is a diagram illustrating a third embodiment of a method for evaluating the accuracy of the fusion data, performed by the apparatus for data fusion according to an embodiment of the present disclosure.

Referring to FIG. 9, the apparatus for data fusion 140 may evaluate the accuracy of the fusion data by estimating a depth of a target for the autonomous vehicle. The apparatus for data fusion 140 may use a set of point cloud data aligned with the image data of the camera sensor to estimate a depth of a vehicle in the surrounding environment of the vehicle.

As an example, the apparatus for data fusion 140 may estimate the depth of the vehicle by using the points aligned on the pixels corresponding to an image of the vehicle. More specifically, the apparatus for data fusion 140 may determine an estimated distance to a certain vehicle by using an average depth value of the points aligned on the pixels included in a bounding box on the image of that vehicle. At this time, recognizing the vehicle based on the image data may be accomplished using a conventional vehicle recognition algorithm.

Statistical analysis of the results of test performed in an actual road scenario is shown in Table 3, and the image data of the corresponding scenes is shown in FIG. 9. Four pieces of image data, each containing vehicles at various distances, were considered for evaluation. These pieces of image data were captured while the vehicles were driving at 35 km/h.

The apparatus for data fusion 140 may evaluate the accuracy of the fusion data by comparing the obtained estimated distance to each of the vehicles with an actual measured distance obtained using a separate distance measurement sensor 150 such as a laser distance meter. That is, the accuracy of the depth estimation based on the fusion data may be calculated in consideration of the difference between the actual measured distance and the estimated distance.

For example, vehicle C3 in Scene 4 940 is a measured vehicle located at a distance of 80 m or more, and it can be seen that the difference between the actual measured distance and the estimated distance for the vehicle is 9 cm. It can be seen that since such a difference is within the allowable maximum distance error range, the accuracy of the fusion data generated through the apparatus for data fusion 140 according to the embodiments of the present disclosure is high.

TABLE 3

| Scene | Vehicles | Actual Distance (m) | Estimated Distance (m) | Error (m) |
|---|---|---|---|---|
| Scene 1(910) | C1 | 18.75 | 18.78 | 0.03 |
| Scene 2(920) | C1 | 19.42 | 19.46 | 0.04 |
|  | C2 | 40.88 | 40.92 | 0.04 |
| Scene 3(930) | C1 | 8.01 | 7.98 | −0.03 |
|  | C2 | 52.35 | 52.42 | 0.07 |
|  | C3 | 63.08 | 63.15 | 0.07 |
|  | C4 | 76.48 | 76.56 | 0.08 |
| Scene 4(940) | C1 | 44.69 | 44.6 | −0.09 |
|  | C2 | 58.55 | 58.62 | 0.07 |
|  | C3 | 83.58 | 83.67 | 0.09 |

The methods according to the embodiments according to the present disclosure may be embodied in the form of program instructions executable by various computer means, and may be recorded on a computer-readable medium. The computer-readable medium may include program instructions, data files, data structures, etc. alone or in combination. The program instructions recorded on the computer-readable medium may be those specially designed and configured for the purposes of the embodiments, or may be those known and available to those having skill in the computer software art. Examples of the computer-readable recording medium include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices. Examples of the program instructions may include both machine codes such as produced by a compiler, and higher-level language codes that may be executed by the computer using for example an interpreter. The hardware devices described above may be configured to operate as one or more software modules to perform the operations of the embodiments, and vice versa.

The software may include a computer program, code, instructions, or a combination of one or more of the above, and may configure a processing device to operate as desired, or make it possible to instruct the processing device independently or collectively. The software and/or data may be permanently or temporarily embodied in any type of machine, component, physical device, virtual equipment, computer storage medium or device, or propagated signal wave so as to be interpreted by the processing device or to provide instructions or data to the processing device. The software may be distributed over networked computer systems to be stored or executed in a distributed manner. The software and data may be stored on one or more computer-readable recording media.

Although the embodiments have been described with reference to the limited drawings as described above, those skill in the art can apply various technical modifications and variations to the embodiments based on the above. For example, even if the described techniques are performed in a different order than the described method, and/or components of the described systems, structures, devices, circuits, or the like are combined in a different form than the described method or are replaced or substituted by other components or equivalents, a desired result can be achieved.

Therefore, other implementations, other embodiments, and equivalents to the claims are within the scope of the claims that follow.

DESCRIPTION OF SYMBOLS

100: system for data fusion
110: first sensor
120: second sensor
130: marker board
140: apparatus for data fusion
141: communication device
142: processor
150: distance measurement sensor

The invention claimed is:

1. A method for data fusion between calibrated heterogeneous sensors, comprising:
identifying image data and point cloud data for a search area by each of a camera sensor and a LiDAR sensor that are calibrated using a marker board having a hole;
recognizing a translation vector determined through calibrating of the camera sensor and the LiDAR sensor; and
projecting the point cloud data of the LiDAR sensor onto the image data of the camera sensor using the translation vector to fuse the image data and the point cloud data,
wherein the translation vector is determined based on a first distance from the camera sensor to the marker board and a second distance from the LiDAR sensor to the marker board, and
wherein the first and the second distances are determined using a focal length of the camera sensor, a radius of the hole in the marker board, and a radius of the hole recognized through each of the camera sensor and the LiDAR sensor.

2. The method of claim 1, further comprising evaluating accuracy of a fusion data obtained by fusing of the image data and the point cloud data.

3. The method of claim 2, wherein evaluating the accuracy comprises evaluating the accuracy of the fusion data based on a correspondence degree between positions of pixels corresponding to a reference area of the image data in the fusion data and positions of points of the point cloud data corresponding to the reference area.

4. The method of claim 2, wherein evaluating the accuracy comprises evaluating the accuracy of the fusion data by visualizing points of the point cloud data in the fusion data, and by using a correspondence degree between color values of the visualized points and pixel values of the image data which is identified.

5. The method of claim 2, wherein evaluating the accuracy comprises evaluating the accuracy of the fusion data by determining an estimated distance to a target using points of the point cloud data in the fusion data, which are aligned with pixels corresponding to an image of the target, and by comparing the determined estimated distance with a measured distance to the target measured through an existing target recognition algorithm.

6. An apparatus for data fusion between heterogeneous sensors, comprising:
a processor configured to perform data fusion between a camera sensor and a LiDAR sensor,
wherein the processor is configured to:
identify image data and point cloud data for a search area by each of the camera sensor and the LiDAR sensor that are calibrated using a marker board having a hole;
recognize a translation vector determined through calibrating of the camera sensor and the LiDAR sensor; and
project the point cloud data of the LiDAR sensor onto the image data of the camera sensor using the recognized translation vector to fuse the identified image data and point cloud data,
wherein the translation vector is determined based on a first distance from the camera sensor to the marker board and a second distance from the LiDAR sensor to the marker board, and
wherein the first and the second distances are determined using a focal length of the camera sensor, a radius of the hole in the marker board, and a radius of the hole recognized through each of the camera sensor and the LiDAR sensor.

7. The apparatus of claim 6, wherein the processor is further configured to evaluate accuracy of fusion data obtained through fusing of the identified image data and point cloud data.

8. The apparatus of claim 7, wherein the processor is further configured to evaluate the accuracy of the fusion data based on a correspondence degree between positions of pixels corresponding to a reference area of the identified image data in the fusion data and positions of points of the point cloud data corresponding to the reference area.

9. The apparatus of claim 7, wherein the processor is further configured to evaluate the accuracy of the fusion data by visualizing the points of the point cloud data in the fusion data, and by using a correspondence degree between color values of the visualized points and pixel values of the identified image data.

10. The apparatus of claim 7, wherein the processor is further configured to evaluate the accuracy of the fusion data by determining an estimated distance to a target using points of the point cloud data in the fusion data, which are aligned with pixels corresponding to an image of the target, and by comparing the determined estimated distance with a measured distance to the target measured through an existing target recognition algorithm.

* * * * *